United States Patent [19]

Shin

[11] Patent Number: 5,097,334

[45] Date of Patent: Mar. 17, 1992

[54] SYNCHRONIZING SIGNAL SEPARATOR

[75] Inventor: Wook-Hee Shin, Suwon, Rep. of Korea

[73] Assignee: SamSung Electronics Co., Ltd., Suwon, Rep. of Korea

[21] Appl. No.: 446,874

[22] Filed: Dec. 6, 1989

[30] Foreign Application Priority Data

Jul. 21, 1989 [KR] Rep. of Korea ............... 1989-10378

[51] Int. Cl.$^5$ ............................................ H04N 5/04
[52] U.S. Cl. .................................. 358/153; 358/148
[58] Field of Search ........................ 358/148, 153

[56] References Cited

U.S. PATENT DOCUMENTS 4,583,119 4/1986 Roscoe ........................ 358/148
4,709,267 11/1987 Sendelweck ................. 358/148
4,894,719 1/1990 Moon ............................ 358/153

Primary Examiner—James J. Groody
Assistant Examiner—David E. Harvey
Attorney, Agent, or Firm—Robert E. Bushnell

[57] ABSTRACT

A synchronizing signal separator in the circuit of a monitor selects between a composite synchronizing signal and a separate synchronizing signal under the control of a priority order stage, and it separates a composite synchronizing signal into a vertical synchronizing signal and a horizontal synchronizing signal. The priority order stage cuts off a composite synchronizing signal when a composite synchronizing signal and a separate synchronizing signal are concurrently detected.

12 Claims, 1 Drawing Sheet

SYNCHRONIZING SIGNAL SEPARATOR

BACKGROUND OF THE INVENTION

The present invention relates to a synchronizing signal separator in a monitor circuit and more particularly to a synchronizing signal separator distinguishing between a composite synchronizing signal and a separate synchronizing signal and, sending out a vertical or a horizontal synchronizing signal separately according to a designated priority order.

Conventionally, in order to send out to a desired place a horizontal synchronizing signal, a vertical synchronizing signal and a composite synchronizing signal of the horizontal synchronizing (H-Sync) signal and the vertical synchronizing (V-Sync) signal, switching by a separate connector or switch should be employed in accordance with a given input signal. In other words, an appropriate input terminal must be selected according to the kind of the input signal. As these various input signals had to be selected manually rather than automatically, it gave rise to a problem which frequently made the circuit unstable when a surge voltage occurred during its operation.

SUMMARY OF THE INVENTION

Thus, an object of the present invention is to provide a synchronizing signal separator contrived to send out a vertical synchronizing signal and a horizontal synchronizing signal separately when a composite synchronizing signal thereof and each separate synchronizing signal are concurrently input according to a given priority order, depending on input condition of the composite synchronizing signal and the respective separate synchronizing signal.

According to an aspect of the invention, the signal separator for separating synchronizing signals includes a first detector for detecting input of a composite synchronizing signal, a second detector for detecting input of a separate horizontal synchronizing signal, a priority deciding stage for cutting off output of the first detector when the separate synchronizing signal and the composite synchronizing signal are detected at the same time, a horizontal synchronizing signal generator for generating the horizontal synchronizing signal from the first detector or the second detector under the control of the priority deciding means, means for passing the horizontal synchronizing signal through a lowpass filter and a vertical synchronizing signal generator for generating the vertical synchronizing signal by comparing an output from the lowpass filter with the separate vertical synchronizing signal.

BRIEF DESCRIPTION OF THE DRAWING

For a better understanding of the invention and to show how the same may be carried into effect, reference will now be made, by way of example, to the accompanying diagrammatic drawing, in which.

DETAILED DESCRIPTION OF THE INVENTION

EXAMPLE I

Figure 1:
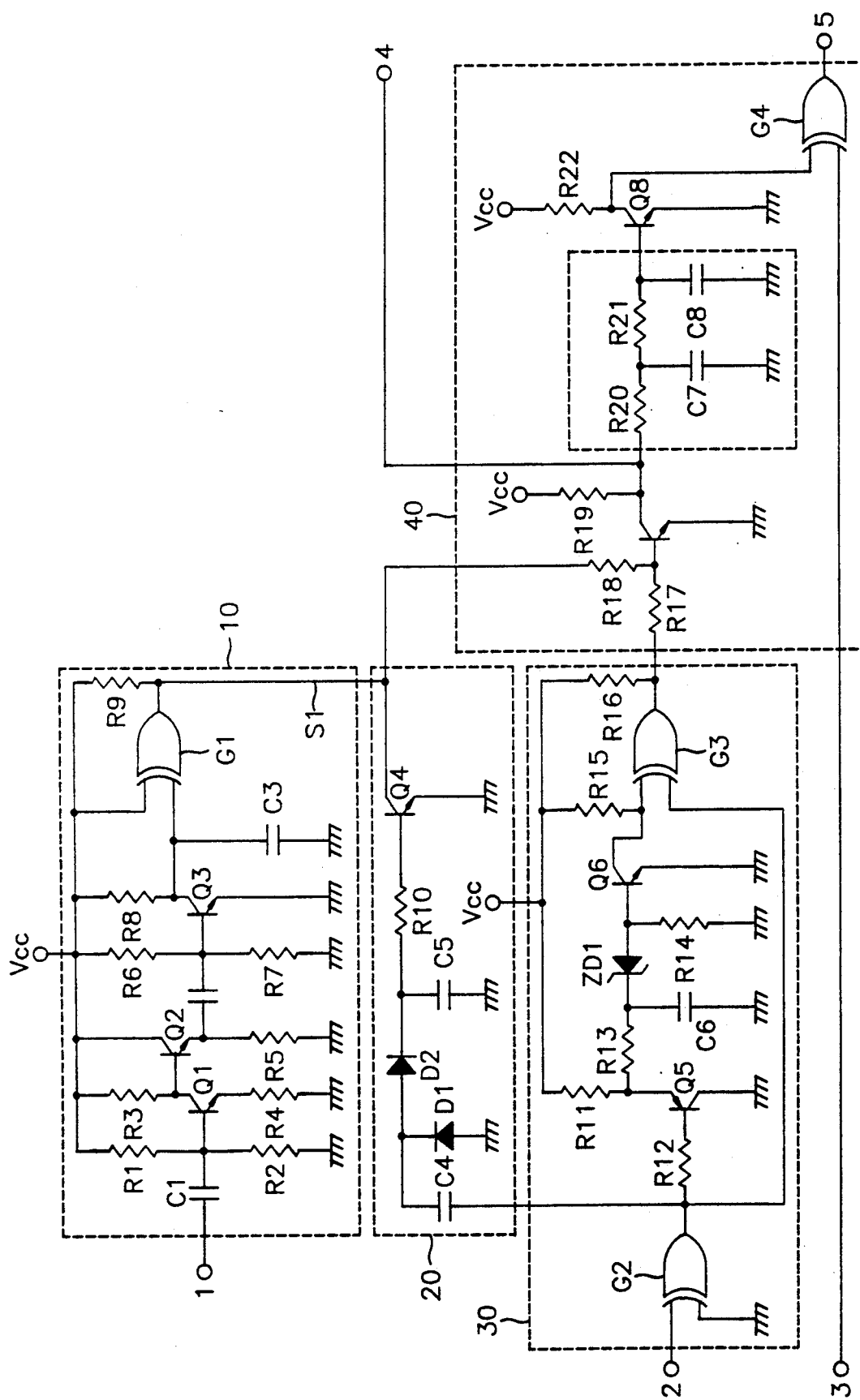
FIG. 1 is a circuit of an embodiment construction according to the present invention.

Assuming that only composite synchronizing signals are input into the first input terminal 1 of composite synchronization detector 10 as a first case, the deflecting synchronizing signal of the composite synchronizing signal which is input in a negative condition is inversely amplified by the first transistor Q1 via the first coupling condenser C1 and is detected at the emitter of the second transistor Q2 used as a buffer.

The detected signal is applied to the base of the third transistor Q3 via the second coupling condenser C2. So, the third transistor Q3 operates with its base potential attaining a logic high level. As a result, the output of the first exclusive OR gate G1 whose one input terminal keeps logic high level at all times and whose other input terminal is connected to the output terminal of the third transistor Q3 generates a logic high level detection signal S1 according to the operating characteristics of exclusive OR gate G1.

The reason is that one terminal of the first exclusive OR gate G1 is connected to a signal in logic high level at this time causes the output of the first exclusive OR gate G1 to generate a detection signal S1 according to whether there is a composite synchronizing signal in the input terminal or not.

Therefore, if no deflecting synchronizing signal of a composite synchronizing signal is applied to the first input terminal 1, no signal is applied to the third transistor Q3. Thus, a signal in logic high level is applied to both of the input terminals of the first exclusive OR gate G1 and its output terminal attains a low level without detecting a composite synchronizing signal. It is because bias voltage caused by the two resistances R6, R7 which establish the base potential level of the third transistor Q3 by being connected to supply power source terminal Vcc cannot reach operating voltage VT expressed by the formula (1) in case the third transistor Q3 does not operate because no signal is applied to the base of the third transistor Q3 through the second coupling condenser C2.

$$\frac{R7}{R6 + R7} \times Vcc < VT \tag{1}$$

On the other hand, the output signal S1 of the first exclusive OR gate G1 in logic high level is inversely amplified by the seventh transistor Q7 through resistance R18. As a result, it sends a horizontal synchronizing signal to the first output terminal 4, and the output signal at the collector of the seventh transistor Q7 is input to one terminal of the fourth exclusive OR gate G4 by being inversely amplified by the eighth transistor Q8 via the low-pass filter consisting of two resistances R20, R21 and two condensers C7, C8.

Although the other terminal of the fourth exclusive OR gate G4 is arranged to receive an input vertical synchronizing signal by being connected to the third input terminal 3, it is assumed that only the composite synchronizing signals are input in this time. Since a vertical synchronizing signal is not input from the third input terminal 3 and only the vertical synchronizing signal separated from the composite synchronizing signal is output to the second output terminal 5 via the fourth exclusive OR gate G4.

EXAMPLE II

As a second case, an account of the instance is given, in which a horizontal synchronizing (H-Sync) signal is input to the second input terminal 2 without an input of a composite synchronizing signal and of a vertical synchronizing signal is input separately to the third input terminal 3, the second exclusive OR gate G2 with its one terminal connected to the second input terminal 2 generates an output synchronizing signal according to the input signal from the second input terminal 2 due to grounding of the other terminal of the exclusive OR gate G2.

When a horizontal synchronizing signal is input to the second input terminal 2 to attain a logic high level, an output in logic high level is generated from the second exclusive OR gate G2 according to the operating characteristics of the exclusive OR as stated above, and applied to the base of the fifth transistor Q5 through resistance R12.

At this juncture, the fifth transistor Q5 will not operate because the base potential level is logic high, and the emitter stays at a logic high level owing to supply voltage Vcc.

So, collector voltage in logic high level of the, fifth transistor Q5 is low-pass-filtered through the integral circuit consisting of a resistance R13 and a condenser C6, and turns the sixth transistor Q6 on with the help of zener diode ZD1 and resistance R14.

Consequently, since current of supply voltage Vcc is bypassed via the collector and the emitter of the sixth transistor Q6, one terminal of the third exclusive OR gate G3 attains a low level, while a horizontal synchronizing signal detected from the second exclusive OR gate G2 is in the other terminal thereof. The output of the third exclusive OR gate G3, depending upon the state of H-synchronizing signal, is inverted and sent to the first output terminal 4 through the base and collector of the seventh transistor Q7. As the horizontal synchronizing signal comprising such a high frequency component cannot pass through the low-pass filter 41, the eighth transistor Q8 does not operate and the fourth exclusive OR gate G4 with its one terminal connected to the collector of the eighth transistor Q8 depends on the condition of vertical synchronizing signal input to the other terminal of the fourth exclusive OR gate G4 through the third input terminal 3 and a vertical synchronizing signal is finally output to the second output terminal 5.

EXAMPLE III

As a third case, an account of the instance is given, in which a composite synchronizing signal is input to the first input terminal 1 and, at the same time, a horizontal synchronizing signal is input to the second input terminal 2 and a vertical synchronizing signal is input to the third input terminal 3.

First of all, when a composite synchronizing signal and a separate synchronizing signal are input at the same time, it gives rise to a problem in deciding the priority order between the composite synchronizing signal and the separate synchronizing signal. Here, priority is given to the separate signal.

In other words, in case the output terminal of the second exclusive OR gate G2 attains a logic high level due to the horizontal synchronizing signal input to the second input terminal 2, the fourth transistor Q4 in the priority order decision stage 20 operates and the composite synchronizing detection signal S1 from the first exclusive OR gate G1 is bypassed through the collector and emitter of the fourth transistor Q4. So, the composite synchronizing signal is thereby cut off by the priority decision stage 20 and only the synchronizing signals are output to both of the two output terminals 4, 5 by the seventh transistor Q7 as in the second case, namely, a horizontal synchronizing signal is presented in the first output terminal 4 and a vertical synchronizing signal input to the third input terminal 3 is output via the second output terminal 5. Thus, priority is given to the separate synchronizing signals.

Such being the case, the present invention has advantages in that it upgrades and automates the product by automatically distinguishing between a composite synchronizing signal and a separate synchronizing signal and sending out such signals separately according to the order of priority.

What is claimed is:

1. A circuit for separating synchronizing signals, comprising:
    first means for detecting a composite synchronizing signal;
    second means for providing a first intermediate synchronizing signal by detecting a separate synchronizing signal;
    means for conducting low frequency components of said first intermediate synchronizing signal;
    third means for providing a second intermediate synchronizing signal in dependence upon said first intermediate synchronizing signal and said low frequency components;
    priority deciding means for cutting off the output of said first detecting means when the separate synchronizing signal and the composite synchronizing signal are detected at the same time; and
    synchronizing signal separating means for separating the output of said first detecting means into a horizontal synchronizing signal and a vertical synchronizing signal or for responding to the second intermediate synchronizing signal by providing a horizontal synchronizing signal, under control of said priority deciding means;
    said first detecting means comprising:
        a first inverting amplifier coupled to receive said composite synchronizing signal;
        a second inverting amplifier;
        a buffer coupled between said first and second inverting amplifiers; and
        a first logic gate having one input port coupled to said second inverting amplifier, and an output port coupled to said priority deciding means and said synchronizing signal separating means.

2. A circuit for separating synchronizing signals, comprising:
    first means for detecting a composite synchronizing signal;
    second means for providing a first intermediate synchronizing signal by detecting a separate synchronizing signal;
    means for conducting low frequency components of said first intermediate synchronizing signal;
    third means for providing a second intermediate synchronizing signal in dependence upon said first intermediate synchronizing signal and said low frequency components;
    priority deciding means for cutting off the output of said first detecting means when the separate synchronizing signal and the composite synchronizing signal are detected at the same time; and
    synchronizing signal separating means for separating the output of said first detecting means into a horizontal synchronizing signal and a vertical synchronizing signal or for responding to the second intermediate synchronizing signal by providing a horizontal synchronizing signal, under control of said priority deciding means;

said first detecting means comprising:
- a first inverting amplifier coupled to receive said composite synchronizing signal;
- a second inverting amplifier; and
- a first logic gate having one input port coupled to said second inverting amplifier, and an output port coupled to said priority deciding means and said synchronizing signal separating means; and said synchronizing signal separating means comprising:
- horizontal synchronizing signal generating means for generating said horizontal synchronizing signal from the output of said output port of said first logic gate and from the second intermediate synchronizing signal from said third detecting means, under control of said priority deciding means;
- a first low-pass filter coupled to receive said horizontal synchronizing signal; and
- vertical synchronizing signal generating means for generating a vertical synchronizing output signal by comparing an output signal from said low-pass filter with a vertical synchronizing input signal.

3. The circuit according to claim 1, wherein said first detecting means comprises:
- means coupled to provide an amplified synchronizing signal by amplifying said composite synchronizing signal; and
- means for generating a composite detection signal in dependence upon said amplified synchronizing signal.

4. The circuit according to claim 2, wherein said first detecting means comprises:
- means coupled to provide an amplified synchronizing signal as said output of said first detecting means, by amplifying said composite synchronizing signal; and
- means for generating a composite detection signal in dependence upon said amplified synchronizing signal.

5. The circuit according to claim 2, wherein said first detecting means further comprises a buffer coupled between said firs and second inverting amplifiers.

6. The circuit according to claim 1, wherein:
said second means comprises a firs logic gate having one input port coupled to receive said separate synchronizing signal, and an output port coupled to provide said first intermediate synchronizing signal to said low frequency components conducting means and said priority deciding means;

said low frequency components conducting means comprises:
- a first transistor having a control electrode coupled to said output port of said first logic gate and principal conduction path electrodes coupled between terminals for different reference potentials,
- a second transistor having a control electrode, and principal conduction path electrodes coupled between said terminals for different reference potentials,
- a low pass filter coupled between one of said principal conduction path electrodes of said first transistor and said control electrode of said second transistor; and said third means comprises a second logic gate having one input port coupled to said output port of said first logic gate, a second input port coupled to one of said principal conducting path electrodes of said second transistor, and an output port coupled to said synchronizing signal separating means.

7. The circuit according to claim 2, wherein:
said second means comprises a first logic gate having one input port coupled to receive said separate synchronizing signal, and an output port coupled to provide said first intermediate synchronizing signal to said low frequency components conducting means and said priority deciding means;

said low frequency components conducting means comprises:
- a first transistor having a control electrode coupled to said output port of said first logic gate and principal conduction path electrodes coupled between terminals for different reference potentials,
- a second transistor having a control electrode, and principal conduction path electrodes coupled between said terminals for different reference potentials,
- a low pass filter coupled between one of said principal conduction path electrodes of said first transistor and said control electrode of said second transistor; and said third means comprises a second logic gate having one input port coupled to said output port of said first logic gate, a second input port coupled to one of said principal conduction path electrodes of said second transistor, and an output port coupled to said horizontal synchronizing signal generating means.

8. The circuit according to claim 2, wherein:
said second means comprises a first logic gate having one input port coupled to receive said separate synchronizing signal, and an output port coupled to provide said first intermediate synchronizing signal to said low frequency components conducting means and said priority deciding means;

said low frequency components conducting means comprises:
- a first transistor having a control electrode coupled to said output port of said first logic gate and principal conduction path electrodes coupled between terminals for different reference potentials, p2 a second transistor having a control electrode, and principal conduction path electrodes coupled between said terminals for different reference potentials,
- a low pass filter coupled between one of said principal conduction path electrodes of said first transistor and said control electrode of said second transistor; and said third means comprises a second logic gate having one input port coupled to said output port of said first logic gate, as second input port coupled to one of said principal conduction path electrodes of said second transistor, and an output port coupled to said horizontal synchronizing signal generating means.

9. The circuit according to claim 1 wherein:
said second means comprises a second logic gate having one input port coupled to receive said separate synchronizing signal, and an output port coupled to provide said first intermediate synchronizing signal to said low frequency components conducting means and said priority deciding means;

said low frequency components conducting means comprises:
- a first transistor having a control electrode coupled to said output port of said second logic gate and principal conduction path electrodes coupled between terminals for different reference potentials,
- a second transistor having a control electrode, and principal conduction path electrodes coupled between said terminals for different reference potentials,
- a low pass filter coupled between one of said principal conduction path electrodes of said first transistor and said control electrode of said second transistor; and p1 said third means comprises a third logic gate having one input port coupled to said output port of said second logic gate, a second input port coupled to one of said principal conduction path electrodes of said second transistor, and an output port coupled to said output port of said first logic gate and said horizontal synchronizing signal generating means.

10. The circuit according to claim 5, wherein:

said second means comprises a second logic gate having one input port coupled to receive said separate synchronizing signal, and an output port coupled to provide said first intermediate synchronizing signal to said low frequency components conducting means and said priority deciding means;

said low frequency components conducting means comprises:
- a first transistor having a control electrode coupled to said output port of said second logic gate and principal conduction path electrodes coupled between terminals for different reference potentials,
- a second transistor having a control electrode, and principal conduction path electrodes coupled between said terminals for different reference potentials,
- a low pass filter coupled between one of said principal conduction path electrodes of said first transistor and said control electrode of said second transistor; and said third means comprises a third logic gate having one input port coupled to said output port of said second logic gate, a second input port coupled to one of said principal conduction path electrodes of said second transistor, and an output port coupled to said output port of said first logic gate and said horizontal synchronizing signal generating means.

11. A circuit for separating synchronizing signals, comprising:

- first means for generating a synchronizing detection signal by detecting a composite synchronizing signal;
- a first logic gate having one input port coupled to receive a separate synchronizing signal, and an output port coupled to provide a first intermediate synchronizing signal;
- a first transistor having a control electrode coupled to said output port of said first logic gate and principal conduction path electrodes coupled between terminals for different reference potentials;
- a second transistor having a control electrode, and principal conduction path electrodes coupled between said terminals for different reference potentials;
- a low pass filter coupled between one of said principal conduction path electrodes of said first transistor and said control electrode of said second transistor; and
- a second logic gate having one input port coupled to said output port of said second logic gate, a second input port coupled to one of said principal conduction path electrodes of said second transistor, and an output port;
- priority deciding means for diverting said synchronizing detection signal when said separate horizontal synchronizing signal is detected; and
- synchronizing signal separating means for separating from the output of said first detecting means, and providing a first and second output terminals, respectively, horizontal and vertical synchronizing signals, when said priority deciding means does not detect said separate horizontal synchronizing signal, and for producing the output of said second detecting means and a separate vertical synchronizing signal provided from a vertical synchronizing signal input terminal at said first and second output terminals, respectively, when said priority deciding means detects said separate horizontal synchronizing signal.

12. A circuit according to claim 11, wherein sad synchronizing signal separating means comprises:
- horizontal synchronizing signal separating means coupled for separating said horizontal synchronizing separate signal from the output of said first detecting means, or producing said horizontal synchronizing separate signal from the second detecting means in response to the output of said priority deciding means;
- a lowpass filter coupled for lowpass-filtering the output of said horizontal synchronizing signal producing mean; and
- vertical synchronizing signal separating means coupled to said lowpass filter for separating said vertical synchronizing signals from the output of said first detecting means, or producing said separate vertical synchronizing signal supplied from said vertical synchronizing signal input terminal.

* * * * *

UNITED STATES PATENT AND TRADEMARK OFFICE
CERTIFICATE OF CORRECTION

Page 1 of 2

PATENT NO. : 5,097,334
DATED : 17 March 1992
INVENTOR(S) : Wook-Hee SHIN

It is certified that error appears in the above-identified patent and that said Letters Patent is hereby corrected as shown below:

Column 1, Line 9, delete "and";

Column 3, Line 17, insert --the-- before "collector", and delete the comma (second occurrence);

Claim 5, Column 5, Line 46, replace "firs" with --first--;

Claim 6, Column 5, Line 48, replace "firs" with --first--;

Claim 8, Column 6, Line 49, delete "p2";

Claim 9, Column 7, Line 18, delete "p1";

UNITED STATES PATENT AND TRADEMARK OFFICE
CERTIFICATE OF CORRECTION

PATENT NO. : 5,097,334
DATED : 17 March 1992
INVENTOR(S) : Wook-Hee SHIN

It is certified that error appears in the above-identified patent and that said Letters Patent is hereby corrected as shown below:

Claim 11, Column 8, Line 30, replace "a" with --at--.

Signed and Sealed this

Twenty-fifth Day of May, 1993

Attest:

MICHAEL K. KIRK

Attesting Officer

Acting Commissioner of Patents and Trademarks